(12) United States Patent
Bleuet et al.

(10) Patent No.: US 12,498,266 B2
(45) Date of Patent: Dec. 16, 2025

(54) METHOD FOR DETERMINING THE OPERATING STATE OF A LIGHT-EMITTING IMPLANT

(71) Applicants: Commissariat à l'Energie Atomique et aux Energies Alternatives, Paris (FR); CENTRE HOSPITALIER UNIVERSITAIRE GRENOBLE ALPES, La Tronche (FR); UNIVERSITE GRENOBLE ALPES, Saint Martin D'Heres (FR)

(72) Inventors: Pierre Bleuet, Grenoble (FR); Claude Chabrol, Grenoble (FR); Cécile Moro, Grenoble (FR); Stephan Chabardes, La Tronche (FR); Alim Louis Benabid, Grenoble (FR)

(73) Assignees: Commissariat à l'Energie Atomique et aux Energies Alternatives, Paris (FR); CENTRE HOSPITALIER UNIVERSITAIRE GRENOBLE ALPES, La Tronche (FR); UNIVERSITE GRENOBLE ALPES, Saint Martin D'heres (FR)

( * ) Notice: Subject to any disclaimer, the term of this patent is extended or adjusted under 35 U.S.C. 154(b) by 160 days.

(21) Appl. No.: 18/476,487

(22) Filed: Sep. 28, 2023

(65) Prior Publication Data
US 2024/0110828 A1    Apr. 4, 2024

(30) Foreign Application Priority Data
Sep. 29, 2022 (FR) .................... 22 09903

(51) Int. Cl.
*G01J 1/44* (2006.01)
*A61N 5/06* (2006.01)
*G01J 1/42* (2006.01)

(52) U.S. Cl.
CPC .............. *G01J 1/44* (2013.01); *A61N 5/0601* (2013.01); *G01J 2001/4247* (2013.01); *G01J 2001/444* (2013.01); *G01J 2001/446* (2013.01)

(58) Field of Classification Search
CPC .. A61N 5/0601; G01J 1/44; G01J 2001/4247; G01J 2001/444; G01J 2001/446
See application file for complete search history.

(56) References Cited

U.S. PATENT DOCUMENTS 8,706,243 B2 * 4/2014 Gefen .................. A61N 1/3787
607/53
11,395,620 B1   7/2022 Moshe
(Continued)

FOREIGN PATENT DOCUMENTS

JP        2012095803 A  *  5/2012
WO   WO-2020075656 A1 *  4/2020

OTHER PUBLICATIONS

Preliminary French Search Report issued May 10, 2023 in 22 09903 filed on Sep. 29, 2022, 9 pages (with English Translation of Categories of Cited Documents & Written Opinion).

*Primary Examiner* — Tarifur R Chowdhury
*Assistant Examiner* — Joshua M Carlson
(74) *Attorney, Agent, or Firm* — Oblon, McClelland, Maier & Neustadt, L.L.P.

(57) ABSTRACT

A method for determining the operating state of a light-emitting implant implanted in the brain of a living being, the light-emitting implant including a light source responsible for emitting light into the brain of the living being, the method using a diagnosing device that includes a receiver of a light signal transmitted through a first eye of the living being and a device for determining the operating state of the light-emitting implant based on the received transmitted light signal.

12 Claims, 3 Drawing Sheets

(56) References Cited

U.S. PATENT DOCUMENTS

| | | | |
|---|---|---|---|
| 2013/0308099 A1* | 11/2013 | Stack | A61B 5/6803 |
| | | | 351/209 |
| 2014/0288386 A1 | 9/2014 | Zand et al. | |
| 2016/0007851 A1 | 1/2016 | Araci et al. | |
| 2016/0310055 A1 | 10/2016 | Zand et al. | |
| 2018/0242840 A1 | 8/2018 | Copland | |
| 2018/0372577 A1* | 12/2018 | Chabrol | A61N 5/0601 |
| 2019/0282145 A1 | 9/2019 | Zand et al. | |
| 2021/0076935 A1 | 3/2021 | Copland | |
| 2021/0178175 A1 | 6/2021 | Chabrol et al. | |
| 2021/0244945 A1* | 8/2021 | Chmeissani Raad | H02J 50/30 |
| 2021/0338121 A1 | 11/2021 | Zand et al. | |
| 2022/0118251 A1* | 4/2022 | Buddha | A61N 1/36178 |
| 2022/0228908 A1* | 7/2022 | Lysov | G01J 1/0228 |
| 2022/0386937 A1 | 12/2022 | Moshe | |

\* cited by examiner

METHOD FOR DETERMINING THE OPERATING STATE OF A LIGHT-EMITTING IMPLANT

TECHNICAL FIELD OF THE INVENTION

The present invention relates to a method for determining the operating state of a light-emitting implant. The invention also relates to a device for diagnosing operation of the light-emitting implant.

PRIOR ART

Recently it has been proposed to slow the progression of a pathology using light (any electromagnetic radiation in the range extending from the ultraviolet to the far infrared, including the visible). This principle is notably employed in the form of an intracranial cerebral implant comprising a light source responsible for illuminating a region of the brain with a view to treating the pathology. The implant may notably take the form of an optical fibre at the end of which the light is scattered.

Patent applications EP3302687A1, EP3723851A1 and EP3834884A1 describe such intracranial probes.

However, once these probes have been implanted, it is difficult to know whether light is being correctly delivered to the probe's end. Specifically, the light source may be defective, or the optical fibre may be broken or incorrectly implanted. It should thus be clear that the operating state of the implant is sometimes difficult to determine, without removing it for disassembly and inspection.

There is therefore a need to provide a simple solution allowing the operating state of an intracranial light-emitting implant such as described in the prior-art documents to be determined.

The aim of the invention is to provide a technical solution allowing this objective to be met.

SUMMARY OF THE INVENTION

This aim is achieved via a method for determining the operating state of a light-emitting implant implanted in the brain of a living being, said light-emitting implant comprising a light source responsible for emitting light into the brain of the living being, said method using a diagnosing device that comprises a receiver of a light signal transmitted through a first eye of the living being and means for determining the operating state of the light-emitting implant based on the received transmitted light signal, said method comprising:
  a step of positioning the receiver of the diagnosing device facing the first eye of the living being,
  a step of measuring a light signal received by the receiver when the light-emitting implant is activated,
  a step of comparing data representative of the light signal received by the receiver and at least one reference datum,
  a step of determining the operating state of the light-emitting implant between a functional state and a non-functional state given the result of the comparing step.

According to one particularity, said reference datum is stored beforehand or acquired in a step of calibrating the diagnosing device.

According to another particularity, the calibrating step consists in a step of measuring a reference light signal, carried out when the light-emitting implant is deactivated.

According to another particularity, the step of determining the operating state of the light-emitting implant consists in determining at least one difference between said reference datum and a datum of said data representative of the received light signal and in comparing said difference with a predetermined threshold value.

According to another particularity, the method comprises a step of positioning a point light source facing a second eye of the living being and a step of activating said point light source.

The invention also relates to a diagnosing device used to implement the method such as defined above, the device comprising a mechanical mount to which said receiver is fastened and means for determining the operating state of said light-emitting implant, said means being connected to said receiver and configured to process data delivered by said receiver.

According to one particular embodiment, the receiver is a camera.

According to another particular embodiment, the receiver comprises one or more photodiodes.

According to one particularity, the device comprises a point light source fastened to said mount and intended to be arranged facing a second eye of the living being, in parallel with the receiver.

According to one particular embodiment, the mechanical mount comprises an optical platform provided with a chin rest, and to which said receiver is fastened.

According to another particular embodiment, the mechanical mount comprises a headset to be placed around the head of the living being.

According to one particularity, the headset comprises two eyeglasses, a first eyeglass accommodating said receiver and a second eyeglass accommodating a point light source.

BRIEF DESCRIPTION OF THE FIGURES

Other features and advantages will become apparent from the following detailed description, which is given with reference to the appended drawings, in which.

DETAILED DESCRIPTION OF AT LEAST ONE EMBODIMENT

Figure 1:
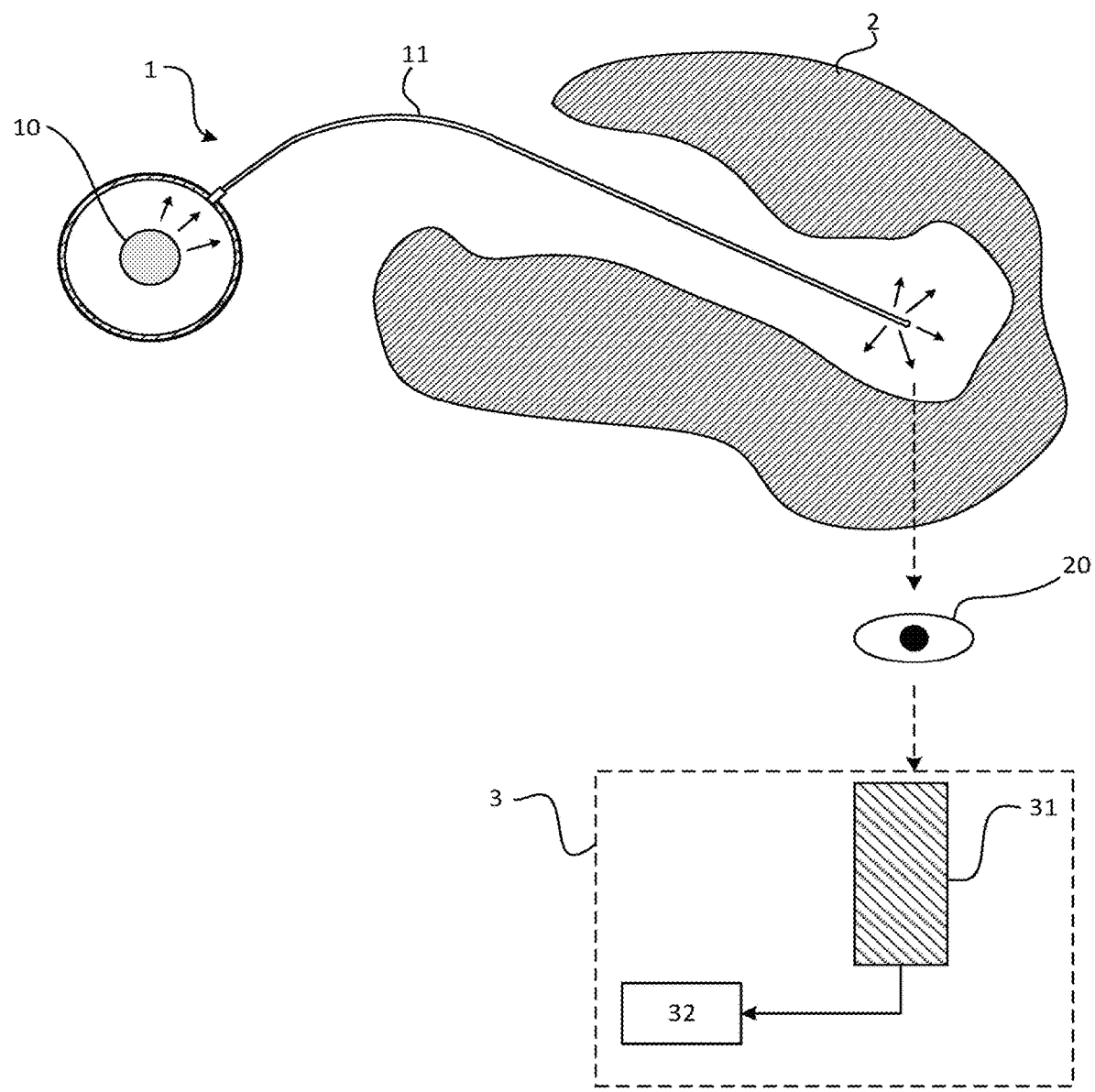
FIG. 1 illustrates the operating principle of a light-emitting implant used in the context of the invention and the operating principle of the diagnosing device of the invention.

With reference to FIG. 1, the invention relates to a device 3 for diagnosing the operation of a light-emitting implant 1 intended to be implanted in the brain 2 of a living being. When it is operating correctly, this light-emitting implant 1 is intended to emit light intended for at least one region of the brain 2 of the living being. By light or light signal, what is meant is any electromagnetic radiation in the range extending from the ultraviolet to the far infrared, including the visible.

The implant 1 uses at least one light source 10 and comprises a probe 11 via which the light is delivered. The probe 11 may take the form of an optical fibre for conveying light from the light source 10 to its distal end, which is located in proximity to the tissues to be treated. The principle of production of the implant may be varied. Patent applications EP3302687A1, EP3723851A1 and EP3834884A1 describe such intracranial probes. By the term implant, what is meant is that the device comprises at least one part implanted in the brain of the living being, even though it may potentially comprise parts located outside the body of the living being.

According to one particular aspect of the invention, the diagnosing device 3 comprises:
- optionally, a mechanical mount;
- a receiver 31 of a light signal transmitted through the eye of the living being, fastened to said mechanical mount;
- means 32 for determining the operating state of the light-emitting implant.

The objective of the diagnosing device 3 is to determine the operating state of the light-emitting implant 1 placed inside the skull of the living being, by detecting the presence or absence of a light signal S transmitted through the eye 20 of the living being. The diagnosing device 3 has the particularity of being non-invasive, i.e. it is placed outside the body of the living being.

The receiver 31 is configured to collect the photons emitted by the light-emitting implant 1 and that are scattered by tissues and emerge via the eyeball.

Various variants of embodiment of the receiver may be envisaged:
- a detector using one or more photodiodes,
- a very sensitive camera.

In all cases, the receiver 31 must be able to measure very low optical powers (between one femtowatt and one nanowatt) with sufficiently short integration times (of the order of one minute or less) so as to make the examination compatible with a measurement on a living being.

Non-limitingly, the receiver 31 may notably be a commercial multi-pixel photon-counting detector based on Geiger-mode avalanche photodiodes, or a large-diameter silicon photodiode allowing a large solid angle of detection. This type of detector does not deliver an image, but a discrete value; however, their sensitivity may be much higher than that of a camera, and they are more compact and faster. It is possible to add a lens of high numerical aperture in front of the detector, with a view to collecting as many photons as possible. This lens then acts as a condenser.

According to one particular aspect of the invention, the observation must be made with a minimum of parasitic light. In other words, the observation is advantageously made under conditions of total darkness to avoid any light pollution due to the environment. By way of example and non-limitingly, the ambient light level must be at least one order of magnitude less than that of the light signal transmitted through the eye.

According to one particular aspect of the invention, the means 32 for determining the operating state of the light-emitting implant may comprise a microprocessor to which the receiver 31 is connected. They are responsible for interpreting the data representative of the signals received by the receiver. It may be envisaged to use various processing modes to determine the operating state of the light-emitting implant:

First Processing Mode:
- a reference first light signal is collected, with the light-emitting implant deactivated, and one or more reference data representative of this first light signal are stored in memory; this measurement is advantageously carried out in total darkness;
- next, after activation of the implant, a second light signal is measured using the receiver 31;
- one or more of the data representative of the second light signal are compared with one or more of the corresponding reference data;

Second Processing Mode:
- one or more reference data are stored beforehand in the factory and correspond to a reference state in which the system is placed in total darkness;
- the remainder of the processing is just as described above.

By data representative of a light signal, what is meant is a maximum light intensity, for example measured by one or more pixels of the image captured (by the camera), an average of a plurality of measured light intensities, etc. Any other datum could be envisaged.

If the compared data are identical, the means 32 for determining the operating state of a light-emitting implant 1 may conclude that the light-emitting implant 1 is defective. If one or more of the data generated by the received second signal differ from those representative of the first signal, the determining means 32 may conclude that the light-emitting implant 1 is functional. It is possible to set a threshold above which the means 32 for determining the operating state of the implant determine that one or more of the data generated by the second signal differ sufficiently from those representative of the first signal.

Non-limitingly, the following is one simple processing mode:
- a first image, intracerebral light-emitting implant 1 switched off, makes it possible to check the darkness conditions: the signal or the measured image corresponds only to the noise generated by the detector or the camera; then,
- a second image, light-emitting implant 1 activated, makes it possible, if the light-emitting implant 1 is perfectly functional, to observe the contribution, to the signal or to the measured image, of the photons emitted by the intracerebral implant and scattered in the tissues.

Other operating modes may of course be envisaged, depending on the means available and implemented.

Figure 2:
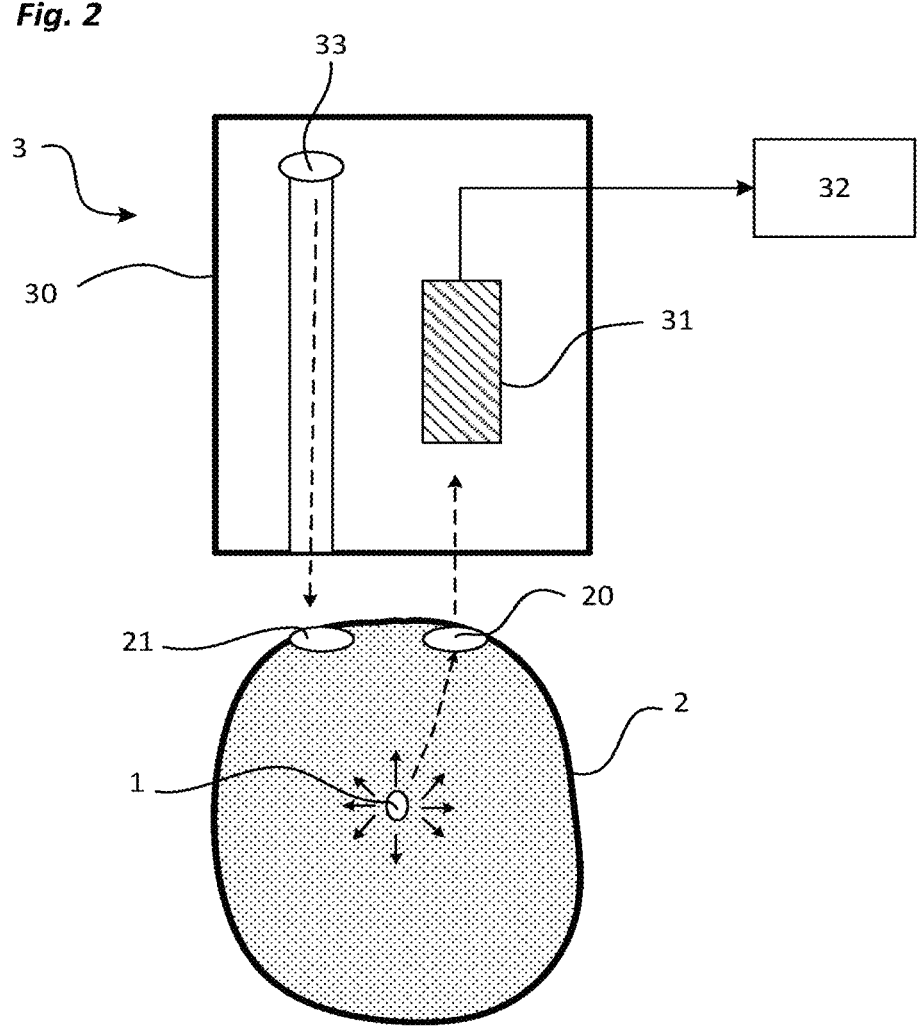
FIG. 2 shows a first example of embodiment of the diagnosing device according to the invention.

In a first embodiment illustrated in FIG. 2, the mechanical mount takes the form of an optical platform 30 to which the receiver 31, the camera for example, is fastened facing one of the two eyes (the eye 20 for example) of the living being. The optical platform 30 may be movable along a plurality of axes in order to make it possible to adjust the position of the camera so as to place it facing the targeted eye. It may be equipped with a chin rest (not shown) to stabilize the head of the living being facing the system.

Advantageously, on this optical platform 30, a point light source 33 will be positioned in front of the other eye 21, in order to ensure that the living being keeps his or her gaze motionless: the living being fixates this point of light with one eye 21, and the camera observes the other eye 20.

In the context of this first embodiment, by way of example, an intracerebral light-emitting implant 1 taking the form of an optical fibre implanted in the brain 2 is used, the end of the optical fibre being located between the substantia nigra, in the mesencephalon and therefore in proximity to the optic chiasma. For example, the light-emitting implant 1 has a peak power of 15 mW, the light being pulsed with a duty cycle of 8%. Dilation of the pupil is not necessary. The room is plunged into absolute darkness, and the patient positions his or her chin on the chin rest of the mount. The distance between the fixed light source 33 (used to keep the gaze stationary) and the receiver 31 (detector or camera) is adjusted to correspond to the interocular distance of the patient. In one particular example, the camera is a 16-bit, 2750×2200 pixel, 2×2 binning camera with pixels of 4.54

µm cooled to −12° C. and positioned at about 5 cm from the eye. The exposure time is set to 20 seconds. Any surrounding light sources are occulted, and the intracerebral implant is switched off. As already described above, the operating mode is for example as follows:

the light-emitting implant 1 is deactivated, and a first image, which should be "black", i.e. contain only the contribution of the internal noise of the camera, is acquired.

the light-emitting implant 1 is then switched on and the above operation repeated, allowing a diffuse spot corresponding to photons delivered by the intracerebral light-emitting implant 1 to be observed.

Advantageously, the light source 33 allowing the gaze to be kept stationary emits at a certain wavelength (green for example, 550 nm) while the receiver 31 (camera or detector) observing the other eye 20 is sensitive only to the emission wavelength of the light-emitting implant 1 (for example, by means of a high-pass filter that only lets wavelengths longer than 600 nm pass).

Figure 3:
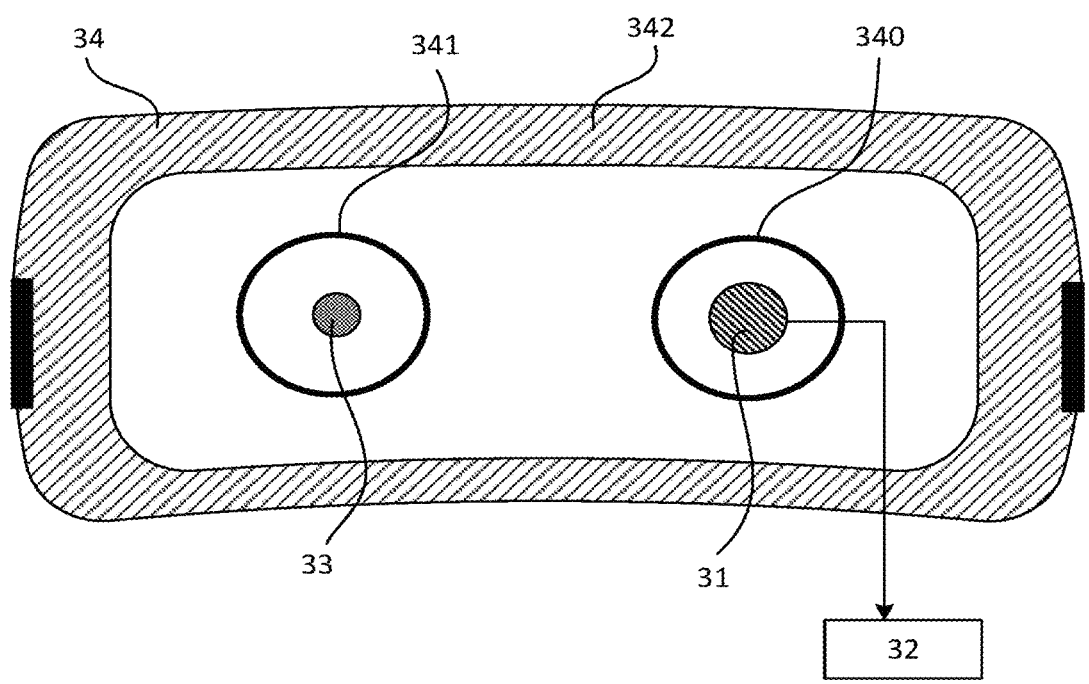
FIG. 3 shows a second example of embodiment of the diagnosing device according to the invention.

According to one variant of embodiment shown in FIG. 3, the mechanical mount takes the form of a headset 34 to be applied around the head of the living being.

The headset 34 bears two eyeglasses 340, 341 intended to be placed facing the two eyes 20, 21 of the living being, respectively, one eyeglass bearing the receiver 31 (detector or camera) and one eyeglass bearing the light source 33 used to concentrate the gaze of the living being. The headset 34 comprises occulting means 342, which are used to create a channel isolated from any light pollution between the first eye 20 of the living being and the capture region of the receiver 31 and between the light source 33 and the second eye 21 of the living being.

This embodiment may be provided with an adapter in order to make it possible to swap the light source 33 and the receiver 31, and thus to observe the right eye or left eye of the living being. Alternatively, both the emitter and the sensor may be on the same eye, or even on both eyes. In addition, the distance between the axis of the light source and the axis of the point detector could be adjustable to the patient's interocular distance.

The operating principle of this second embodiment is identical to that described above with respect to the first embodiment.

Advantageously, it is possible to perform synchronous detection, in order to increase signal-to-noise ratio: the pulsed signal resulting from the optical stimulation device (for example detected electrically by induction on the power cable of the laser, or optically with a photodetector in the skull, or digitally in RF) is then used as an external source to exacerbate the optical signal measured via the eye. The external source may also come from a second optical detector placed on the patient's skull, near the pulsed light source, on the scalp. A detector measures the signal delivered through the scalp, this signal acting as a carrier to increase the signal-to-noise ratio of the detector observing the eye, similar to synchronous detection.

The invention thus has many advantages, among which:
ease of implementation;
a non-invasive solution;
a solution that uses commonly available components.

The invention claimed is:

1. A method for determining an operating state of a light-emitting implant implanted in a brain of a living being, said light-emitting implant comprising a light source configured to emit light into the brain of the living being, said method using a diagnosing device that comprises a receiver configured to receive a portion of the light that is transmitted through a first eye of the living being and processing circuitry configured to determine the operating state of the light-emitting implant based on the received transmitted light, the method comprising:

positioning the receiver of the diagnosing device facing a first eye of the living being, the receiver being configured to receive the light emitted into the brain and transmitted through and exiting the first eye of the living being, measuring a light signal based on the portion of the light received by the receiver via the first eye when the light-emitting implant is activated, comparing data representative of the measured light signal and a reference datum, and determining, by the processing circuitry, the operating state of the light-emitting implant between a functional state and a non-functional state based on a result of the comparing step.

2. The method according to claim 1, wherein said reference datum is stored beforehand or acquired in a step of calibrating the diagnosing device.

3. The method according to claim 2, further comprising calibrating the diagnostic device to obtain the reference datum, the calibrating step including measuring a reference light signal, which is performed when the light-emitting implant is deactivated.

4. The method according to claim 1, wherein the step of determining the operating state of the light-emitting implant includes determining at least one difference between said reference datum and a datum of said data representative of the received light signal, and comparing said difference with a predetermined threshold value.

5. The method according to claim 1, wherein the method further comprises positioning a point light source facing a second eye of the living being and activating said point light source.

6. The diagnosing device used to implement the method defined in claim 1, wherein the diagnosing device comprises;

a mechanical mount to which said receiver is fastened, and the processing circuitry configured to determine the operating state of said light-emitting implant, the processing circuitry being connected to said receiver and configured to process data delivered by said receiver.

7. The diagnosing device according to claim 6, wherein the receiver is a camera.

8. The diagnosing device according to claim 6, wherein the receiver comprises one or more photodiodes.

9. The diagnosing device according to claim 6, further comprising a point light source fastened to said mount and arranged facing a second eye of the living being, in parallel with the receiver.

10. The diagnosing device according to claim 6, wherein the mechanical mount comprises an optical platform to which said receiver is fastened.

11. The diagnosing device according to claim 6, wherein the mechanical mount comprises a headset to be placed around the head of the living being.

12. The diagnosing device according to claim 11, wherein the headset comprises two eyeglasses, a first eyeglass accommodating said receiver and a second eyeglass accommodating a point light source.

* * * * *